United States Patent [19]
Parker

[11] Patent Number: 5,810,522
[45] Date of Patent: Sep. 22, 1998

[54] HAND-HELD BAR EDGING TOOL AND SUPPORT THEREFOR

[76] Inventor: Val Parker, 7 Squire La., Pittsford, N.Y. 14534

[21] Appl. No.: 752,660

[22] Filed: Nov. 19, 1996

[51] Int. Cl.[6] .................................................. B23B 39/00
[52] U.S. Cl. ............................ 408/103; 82/113; 408/105; 408/108; 408/186; 408/211
[58] Field of Search .................................. 408/103, 105, 408/104, 108, 112, 186, 188, 211; 82/113

[56] References Cited

U.S. PATENT DOCUMENTS

| | | | |
|---|---|---|---|
| 2,610,530 | 9/1952 | Caliendo | 408/104 |
| 2,645,951 | 7/1953 | Sponsler | 408/103 |
| 2,997,900 | 8/1961 | Pugsley | 408/112 |
| 3,708,238 | 1/1973 | Kissane | 408/112 |
| 3,817,649 | 6/1974 | Medney | 408/211 |
| 4,072,440 | 2/1978 | Glover | 408/112 |
| 4,105,358 | 8/1978 | Walker | 408/108 |
| 4,572,715 | 2/1986 | Wolff | 408/112 |
| 4,605,115 | 8/1986 | Genans | 408/103 |
| 4,896,663 | 1/1990 | Vandewalls | 408/105 |
| 5,051,044 | 9/1991 | Allen | 408/112 |
| 5,054,972 | 10/1991 | Cooney | 408/211 |
| 5,062,747 | 11/1991 | Chen | 408/112 |
| 5,076,122 | 12/1991 | Katzenburger et al. | 408/211 |
| 5,197,362 | 3/1993 | Birkestrand | 82/113 |

*Primary Examiner*—Daniel W. Howell
*Assistant Examiner*—Adesh Bhargava
*Attorney, Agent, or Firm*—Shlesinger, Fitzsimmons & Shlesinger

[57] ABSTRACT

A tool housing is secured to the head of an electric hand drill so that a tool head, which is secured in the drill chuck, extends into the housing. The housing is secured to one end each of a pair of spaced, parallel guide rods that extend slidably through the upper end of the frame of a working-clamping vise and which are secured at their opposite ends to an end bracket. Compression springs which surround the guide rods between the housing and the vise frame normally resist movement of the housing and the tool head toward the vise. In use, two jaws on the vise frame are moved into clamping engagement with a piece of bar stock to support the tool on the stock with the tool head and cutting bits therein disposed in spaced registry with the end of the work that is to be machined. The operator then squeezes the drill unit trigger to rotate the cutting head, and pushes the hand drill and attached tool housing and cutting head toward the work and against the resistance of the springs, thus to engage the tool bits in the rotating tool head with the confronting end of the stock.

13 Claims, 3 Drawing Sheets

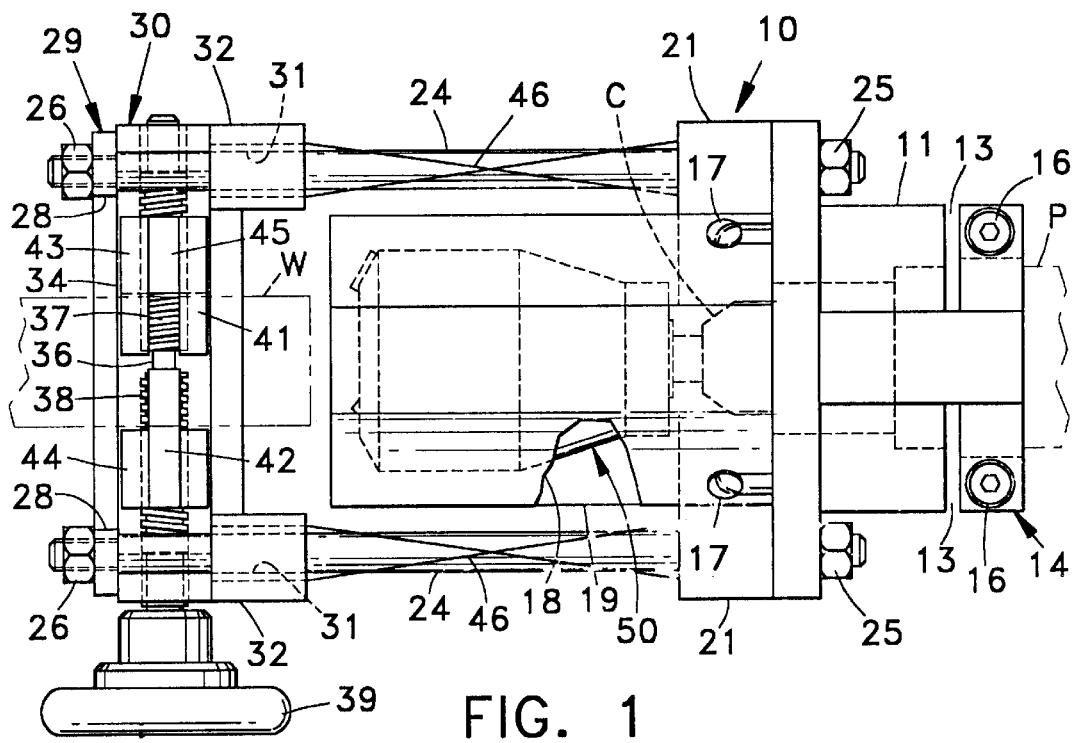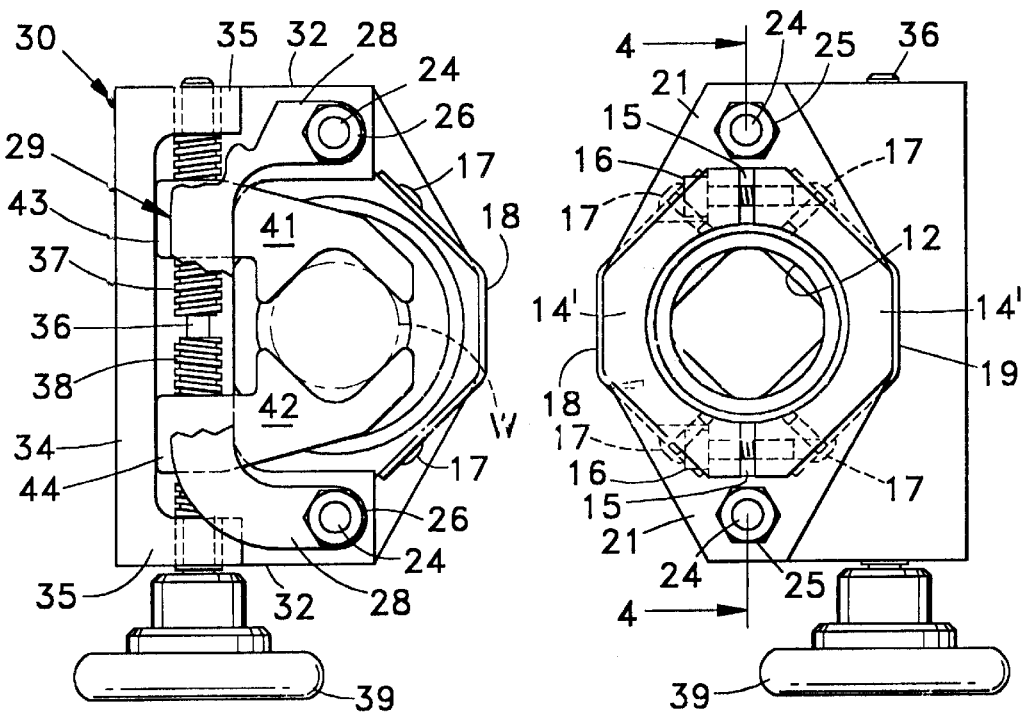

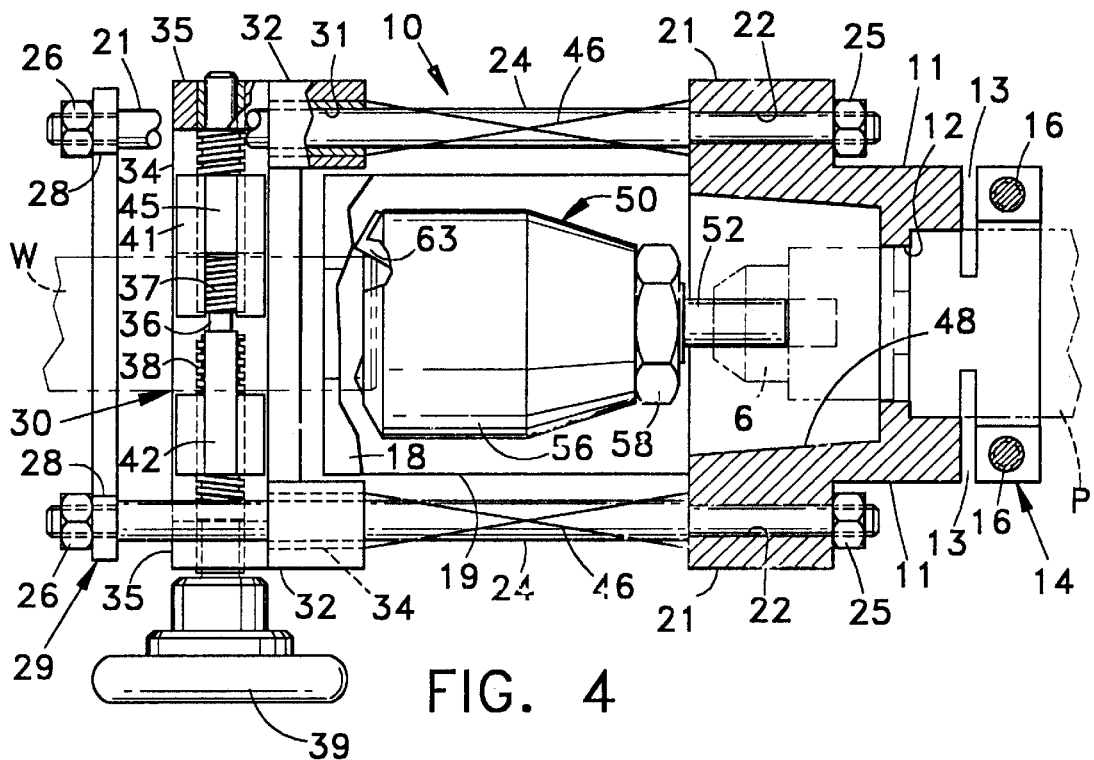
FIG. 4
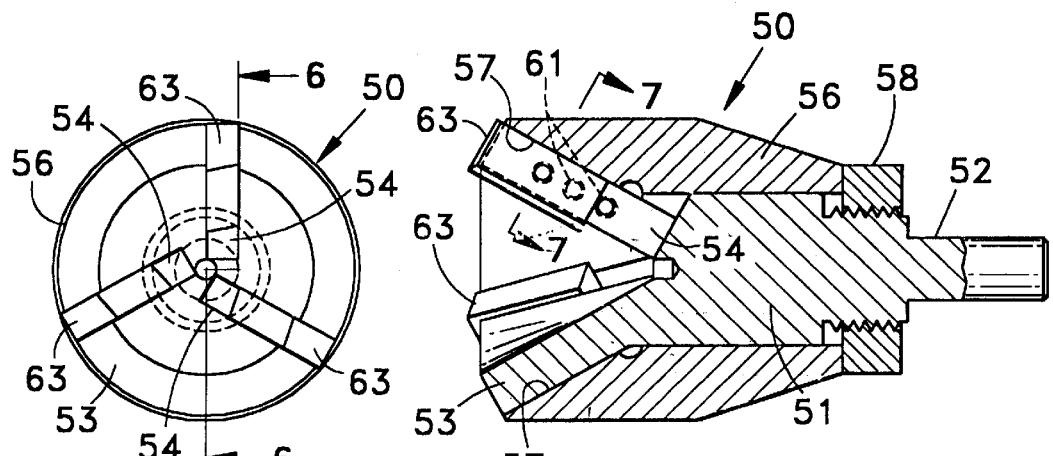
FIG. 5
FIG. 6
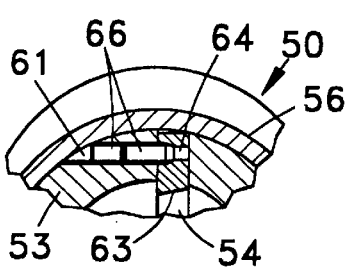
FIG. 7

HAND-HELD BAR EDGING TOOL AND SUPPORT THEREFOR

BACKGROUND OF THE INVENTION

This invention relates to bar edging tools, and more particularly to a hand-held tool operable to grip and chamfer or deburr the end of a piece of bar stock, or to center drill a piece of bar stock, while the stock is still on a rack or the like.

It long has been customary to chamfer the end of a piece of metal bar stock by use of conventional pedestal grinders, belt sanders, or specially made machines, all of which apparatus require physically transporting the bar stock to the grinder, sander, or equipment which is to perform the chamfering operation. These prior art methods of chamfering or edging the ends of bar stock prove to be very time-consuming, cumbersome and expensive. Moreover, use of such prior art apparatus has often resulted in injuries to the operator, particularly in the case of transporting and then chamfering stock on pedestal grinders or belt sanders.

It is an object of this invention, therefore, to provide a novel bar stock chamfering and end drilling tool which obviates the need for transporting the stock to the chamfering or drilling equipment before effecting the actual chamfering or drilling operation.

A more specific object of this invention is to provide a novel hand-held edging tool with a like pistol-like grip, which enables the ends of bar stock to be chamfered and/or drilled without removing the bar stock from a material storage rack, or the like. In other words, without having to first transport the stock to the edging tool.

Another object of this invention is to provide for a hand-held edging tool of the type described a novel support or device which can be removably secured at one end to the end of a piece of bar stock that is to be machined, and which is designed removably to support in its opposite end a power operated hand tool for limited movement toward and away from the end of the stock that is to be machined.

Still another object of this invention is to provide a novel edging tool of the type described which is designed to be operated by a conventional electric of pneumatic hand drill device, and which enables rapid adjustment or replacemnet of its tool bits.

Other objects of this invention will be apparent hereinafter from the specification and from the recital of the appended claims, particularly when read in cojunction with the accompanying drawings.

SUMMARY OF THE INVENTION

The tool inclues a housing having on one end thereof a bracket for securing the head of an electric hand drill or the like in a bore in the housing so that a tool head, which is secured in the drill chuck, extends into the space between a pair of shields that are secured to and project from the opposite end of the housing. The opposite end of the housing is also secured to one end each of a pair of spaced, parallel guide rods the opposite ends of which are secured to an end bracket, and which extend intermediate their ends slidably through the upper end of the frame of a work-clamping vise. Compression springs which surround the guide rods between the housing and the vise frame normally urge the end bracket against the frame of the vise and resist movement of the housing and the tool head toward the vise.

In use, two jaws which are mounted for manual adjustment on the vise frame, are moved into clamping engagement with the end of a piece of bar stock that is to be machined, thus supporting the tool on the stock with the tool head disposed in spaced registry with the end of the work that is to be machined. The operator then squeezes the drill unit trigger to rotate the cutting head, and causes the hand drill and attached tool housing to be moved toward the work and against the resistance of the springs. This engages the rotating tool head with the confronting end of the stock. The tool head contains a plurality of adjustable and replaceable tool bits which thus machine the work.

THE DRAWINGS

FIG. 1 is a plan view of a hand-held bar edging tool of the type made according to one embodiment of this invention, a piece of bar stock and a power unit being shown fragmentarily and in phantom as they appear when fixed to opposite ends of the tool;

FIG. 2 is an end view of this tool as seen when looking at the left end of the tool as shown in FIG. 1;

FIG. 3 is an end view of the tool as seen when looking at the right end of the tool as shown in FIG. 1;

FIG. 4 is a fragmentary sectional view of this tool taken along the line 4—4 in FIG. 3 looking in the direction of the arrows, with portions of the tool being shown in full, and with the cutting head of the tool being shown as it appears when it has been shifted to its advanced, operating position with respect to the bar stock that is to be machined;

FIG. 5 is an end view of the cutting head of the tool as seen when looking toward the left end thereof as shown in FIG. 4;

FIG. 6 is a fragmentary sectional view of the cutting head as it appears when taken along the line 6—6 in FIG. 5 looking in the direction of the arrows;

FIG. 7 is an enlarged, fragmentary sectional view taken generally along the line 7—7 in FIG. 6 looking in the direction of the arrows;

DETAILED DESCRIPTION OF THE PREFERRED EMBODIMENTS

Figure 8:
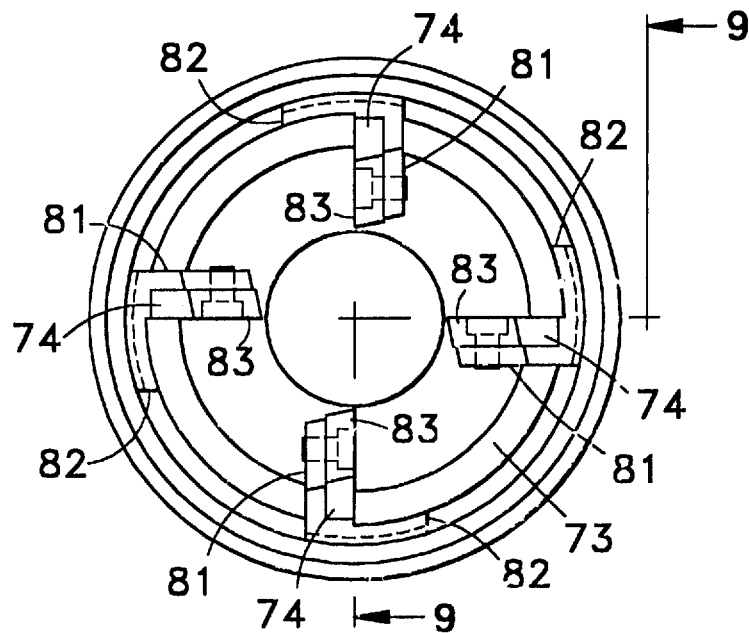
FIG. 8 is an end view similar to FIG. 6, but showing a modified form of the cutting head made according to another embodiment of this invention.

Referring now to the drawings by numerals of reference, 10 denotes generally a bar edging tool having at one end thereof (the right end in FIG. 1) a metal housing 11 having eight intersecting outer surfaces which render the housing generally octagonal in cross section. As shown more clearly in FIG. 4, housing 11 has therethrough an axial bore 12, and adjacent one end thereof (the right end in FIGS. 1 and 4) has on opposite sides thereof a pair of registering, vertical slots 13, which form on the adjacent end of the housing an integral clamping bracket 14. As shown in FIG. 3, bracket 14 has therethrough opposed, registering slots 15, which operatively divide bracket 14 into two opposed jaws 14' separated by the slots 15. Screws 16 connect together the confronting ends of the jaws 14' and are adapted to be adjusted in an obvious manner releasably to secure to tool 10 the operating end of a conventional power unit P, which is shown in phantom by broken lines in FIGS. 1 and 4. Secured at their rear ends by two sets of screws 17 (FIGS. 1 and 3) to the top and bottom surfaces of housing 11 at its end remote from bracket 14, and projecting forwardly therefrom (toward the left in FIGS. 1 and 4) are two, spaced, safety guards or shields 18 and 19, respectively.

Also at its end remote from bracket 14 housing 11 has formed on opposite sides thereof a pair of integral, laterally projecting lugs 21, each of which has therethrough an axial bore 22 (FIG. 4) that extends parallel to the housing bore 12. Each of two elongate, tool supporting rods 24 has at one end thereof (the right end in FIGS. 1 and 4) a reduced-diameter shank portion, which extends through one of the bores 22 in a respective lug 21, and which is secured against axial movement therein in nut 25 which threads onto the adjacent end of the rod 24, and against the associated lug 21. At their opposite ends (the left ends in FIGS. 1 and 4) the rods 24 have thereon other reduced-diameter sections which extend through, and are secured by nuts 26 in, registering openings formed in the upper ends of the spaced, parallel leg sections of a U-shaped bracket denoted generally by numeral 29. Bracket 29 helps to maintain the rods 24 in spaced, parallel relation to each other.

Intermediate their ends the rods 24 extend slidably through a pair of annular sleeve bearings 31, which are secured in registering openings in the upper ends of a pair of integral, upstanding leg sections 32 of a work holding vise denoted generally by the numeral 30. At their lower ends the leg sections 32 are integral with one side of the generally U-shaped base section 34 of vise 30. Rotatably journaled adjacent opposite ends thereof in conventional bearings secured in registering openings in the two spaced, parallel, upstanding leg sections 35 of the base 34 is an elongate drive screw 36. The portion of screw 36 between the base leg sections 35 has formed thereon two sets of drive threads 37 and 38, respectively, one of which sets constitutes a left hand thread, and the other of which constitutes a right hand thread. At one end thereof, the lower end as shown in FIGS. 1, 2 and 4, the screw 36 has fastened thereon a conventional, circular handle or knob 39 by means of which the screw 36 can be rotated manually and selectively in opposite directions about its axis.

Mounted on screw 36 for adjustment toward and away from each other are two work gripping jaws 41 and 42. Jaws 41 and 42 have internally threaded lower ends 43 and 44, respectively, which are mounted in threading engagement with the thread sets 37 and 38, respectively. The upper end of the jaw 42 is slightly narrower than the upper end of the jaw 41, and is disposed to register with a slot 45 formed centrally in the upper end of jaw 41. As shown more clearly in FIG. 2, jaws 41 and 42 are disposed to engage diametrally opposite sides of a piece of cylindrical bar stock or work W, which is shown in phantom by broken lines in FIG. 2. Knob 39 can be rotated to shift the jaws 41 and 42 toward or away from each other thereby selectively to engage and grip or to release a piece of bar stock adjacent the end thereof which is to be machined.

As shown in FIGS. 1 and 4, each of the supporting rods 24 is surrounded intermediate its ends by an elongate compression spring 46, one end of which engages one of the lugs 21 on the housing 11, and the other end of which engages an upstanding leg 32 of the vise 30. As a result, normally when the tool is not in use, the compression springs 46 tend to separate or urge the housing 11 and vise 30 away from each other, and into a rest position (FIG. 1) in which the frame or base 34 of the vise is seated against the U-shaped bracket 29. However, as noted hereinafter, when the tool is placed in use it is possible to cause the housing 11 and vise 30 to be shifted slightly toward one another as in FIG. 4, thereby to compress the springs 46. The compressed springs 46 therefore will tend to return the vise 30 to its position shown in FIG. 1 when the tool is no longer in use.

To prepare the tool 10 for work the power supply P, for example a conventional hand-held electric or pneumatic drill device, is secured adjacent its forward end in the clamping bracket 14 so that its chuck C (broken lines in FIGS. 1 and 4) projects into a large counterbore 48 (FIG. 4) formed in the inner end of housing 11. Secured at one end in the chuck C and projecting therefrom coaxially beyond the inner end of housing 11, and into the space between the safety shields 18 and 19, is the tool cutting head which is denoted generally by the numeral 50.

As shown more clearly in FIGS. 5 to 7, tool head 50 comprises an inner, tool holding member 51 which is circular in cross section, and which has at one end thereof a reduced-diameter shank 52 that is disposed to be secured in the chuck C of the power unit. At its opposite end member 51 has integral therewith the smaller end of a truncated conical sleeve 53, the wall of which has therethrough a plurality (three in the embodiment illustrated) of axially extending slots 54, which are equiangularly spaced from each other around the axis of the holding member 51. Member 51 is surrounded by a generally cup-shaped support 56 having in one end thereof a cylindrical bore surrounding member 51 intermediate the ends thereof, and having coaxially in its opposite end a truncated conical counterbore having a wall 57 which is engaged with the outer conical wall portion of the sleeve 53, and which also closes the bottoms of the slots 54 formed in sleeve 53. A nut 58, which threads onto an externally threaded portion of member 51 adjacent the inner end of its shank 52, engages one end of member 56 releasably to urge its concical surface 57 into engagement with the outer conical surface of the sleeve 53.

Each of the slots 54 in the sleeve 53 opens at one side thereof onto the inner ends of three, spaced, internally threaded openings 61 formed in the wall of sleeve 53 with the axes thereof lying in a plane parallel to a tangent to the outer surface of sleeve 53. Seated in each of the slots 54 with the outer surface thereof seated against the inner surface of the surrounding cup-shaped member 56 is a conventional tool bit 63 having therethrough a circular opening 64 having a countersunk end thereof disposed to register with one of the three holes 61 in the adjacent sidewall of the associated slot 54. Each tool bit 63 is secured in a slot 54 by two set screws 66 which are threaded into the registering opening 61 so that the inner end of the inner set screw 66 becomes seated in the countersunk end of the opening 64 of the associated tool 63, while the second or outer set screw 66 is threaded into opening 61 to prevent undesirable loosening of the inner screw 66 which is engaged with the tool bit. As shown in FIG. 6, it will be apparent to one skilled in the art that each tool bit 63 can be secured in any one of three different positions in the associated slot 54 of the sleeve section 53 of its tool holder 51. Also, although only three tool bits are employed in the tool 50 as shown in FIGS. 5 to 7, it will be apparent to one skilled in the art that additional tool bits can be added to the holder 51 without departing from this invention.

Assuming that the tool head 50 has been properly mounted in the chuck C of the power unit, which may be of the type having a pistol grip handle and associated trigger, and that the tool 10 has been secured by vise 30 to the inner end of the workpiece W as shown in FIG. 1, the work can be machined simply by manually forcing the hand-held power unit P, and hence housing 11 and tool head 50, toward the work W until the various tool bits mounted in the head 50 engage the confronting end of the workpiece W. At such time the trigger of the power unit P can be squeezed therefore causing the tool head 50 to be rotated, and therefore effecting the desired machining of the confronting end of the workpiece. When the machining operation has been completed, the operator withdraws the power unit toward the right in FIG. 4, thereby permitting the springs 46 to urge housing 11 and the tool head 50 back to their inoperative or retracted positions as shown in FIG. 1.

Figure 9:
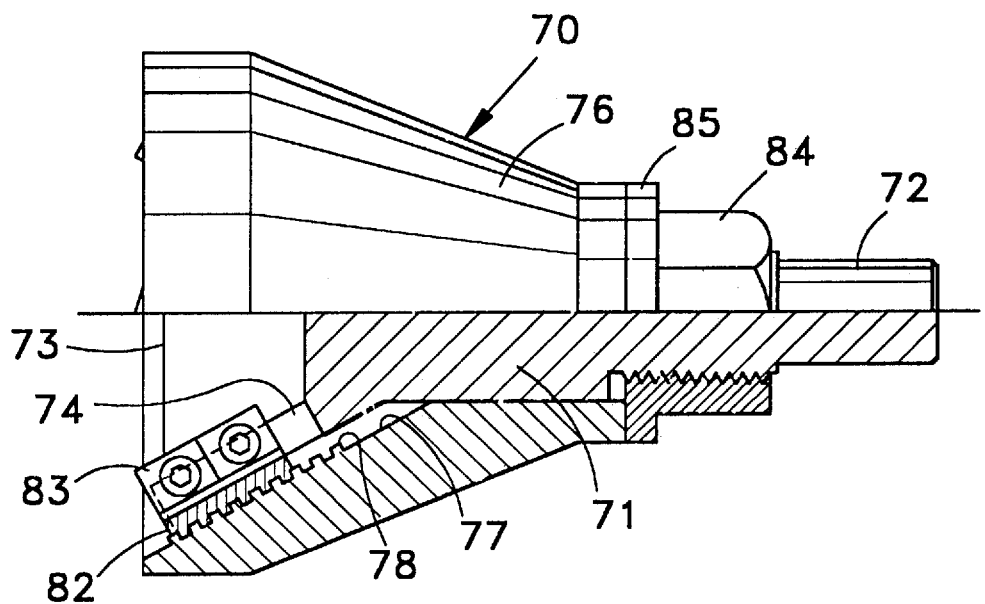
FIG. 9 is a fragmentary sectional view taken generally along the line 9—9 in FIG. 8 looking in the direction of the arrows.

Referring now to FIGS. 8 and 9, 70 denotes a modified tool head having an inner, tool holding member 71 having a reduced-diameter shank section 72 for use in mounting the tool in a power unit in a manner similar to that noted in connection with tool 50. At its opposite end the inner member 71 has formed thereon a truncated conical sleeve section 73 having therethrough a plurality (four in the embodiment illustrated) of equiangularly spaced slots 74. Member 71 is surrounded by an outer, generally cup-shaped support member 76 having a cylindrical section at one end thereof (the right end in FIG. 9) snugly surrounding a corresponding section of the inner member 71. Member 76 has in its opposite end a truncated conical bore 77 the conical surface of which, unlike the embodiment in FIGS. 5 to 7, is slightly spaced radially from the outer, conical surface of the inner member 71. Also unlike the previous embodiment, the inner conical surface 77 of the outer member 76 is internally threaded as at 78.

Mounted for adjustment longitudinally of each of the slots 74 in the holder 71 is a generally L-shaped nest or bit supporting element comprising one leg section 81 extending radially into the truncated conical bore in sleeve 73, and another, externally threaded leg section 82 extending transversely from section 81 adjacent one end thereof, and into the space between sleeve 73 and the surrounding, outer element 76. As shown in FIGS. 8 and 9, the threaded surface of each leg section 82 of a respective nest element 81, 82 has driving or threading engagement with the corresponding threaded surface 78 on the outer member 76. One or more tool bits 83 are secured in a conventional manner by one or more screws to the radially projecting leg section 81 of each nest element 81, 82.

With this construction it is possible to adjust each of the nest elements 81, 82 and their attached tool bits 83 longitudinally of their associated slots 74 simply by rotating the outer member 76 relative to the inner member 71. This can be done by backing off or releasing a nut 84 which is threaded onto an externally threaded portion of the inner member 71 adjacent its shank 72. Nut 84 has a flange section 85 which engages the adjacent end of the outer member 76 selectively to urge the outer member axially toward, or to permit withdrawal of the outer member 76 axially away from, the sleeve section 73 of the inner member. Thus when nut 84 is released or backed off, it permits outer member 76 to be rotated about the axis of cutter head 70, and in turn will effect longitudinal adjustment of the nests 81, 82 in their respective slots 74 in sleeve 73. After the adjustment has been complete the nuts 84 can be once again tightened to prevent undesirable axial shifting of the outer member 76 relative to the inner member 71.

From the foregoing it will be apparent that the present invention provides a relatively simple and inexpensive means for machining the ends of bar stock and the like, while the stock remains in a storage rack, or at any other location to which an operator can bring a novel tool of the type described herein. Typically the tool 10 is attached to the driving end of a power unit, such as an electric hand drill or the like, so that the tool and power unit can be easily transported. The sheilds 18 and 19 can be removed to provide access to chuck C and the tool head 50 for replacement or adjustment thereof. At the end opposite the power unit the tool 10 has a clamping vise mechanism 30, which can be clamped to and immobilize the end of the stock which is to be machined. With the tool 10 thus supported on the stock, the operator need only to urge the power unit, and hence the attached housing 11 and its guide rods 24 toward the immobilized end of the bar stock, and relative to the clamping vise that is secured to the stock. With the tool rigidly attached to the stock, the sliding rods 24 accurately guide the cutting head 50 of the tool into engagement with the end of the stock that is to be machined. The operator then need only operate the power unit P to rotate cutting head 50 thereby accurately to machine the confronting end of the workpiece.

Still another advantage of this novel tool is the fact that the actual cutting head 50 which supports the tool bits does not constitute a permanent part of the tool 10. In prior art cutting tools wherein the cutting elements are physically a part of the tool body, the disadvantage of such cutting tools is the inconvenience of fabricating and resurfacing the cutting edges, and also the lack of adjustability of the cutting edges. Contrary to such prior art devices, the present tool permits the use of different types of tool heads, each with different means for adjusting the tool bits in the associated heads. This considerably reduces the costs normally associated with the need for maintaining on hand a variety of different tools for performing different cutting operations. With applicant's novel construction an operator need only hold the tool by the pistol grip section of the power unit, use the knob 39 for securing the tool to the bar stock that is to be machined, and then simply urge the power unit and housing 11 toward the workpiece while operating the trigger to rotate the cutting head 50 as it engages the confronting end of the workpiece. The tool bits can be designed to chamfer the confronting end of the work according to the profile of the conical surface of the tool holder, and if desired, a center hole can be formed in the bar end by replacing the cutting tool with a drill bit.

While the present invention has been illustrated and described in detail in connection with only certain embodiments thereof, it will be apparent to one skilled in the art that it is capable of still further modification. For example, for machining bar stock of relatively large diameter, a positive screw drive may be incorporated between the vise 30 and the gear box of a power hand tool of the type having a reversible drive, whereby the hand tool could be utilized for shifting the tool head 50 between its advanced and retracted positions. Moreover, the present application is intended to cover any such modifications as may fall within the scope of one skilled in the art, or the appended claims.

I claim:

1. A device for releasably supporting a power operated hand tool in operative registry with an end of a piece of bar stock that is to be machined, comprising a frame having thereon a work gripping mechanism manually adjustable into clamping engagement with a piece of bar stock to secure said frame to said stock adjacent an end of the stock that is to be machined, a tool housing having therethrough a central opening, means connecting said housing to said frame for limited movement of said housing respectively toward and away from said frame, and with said opening in said housing positioned to register with the end of the stock that is to be machined, when said frame is secured to the stock, and means on said housing for releasably securing thereto a power operated hand tool with a rotatable tool bearing end thereof extending into said opening in said housing, said connecting means including a plurality of support members each secured at one end to said housing for movement therewith, and being slidable adjacent the opposite end thereof relative to said frame during said limited movement of said housing, resilient means normally urging said housing away from said frame and resiliently into a first limit position, and said housing being movable by and with said hand tool against the resistance of said resilient means and toward said frame to engage a tool on the rotatable tool bearing end of the hand tool with the end of the stock that is to be machined, when said frame is secured to said stock and said hand tool is secured to said housing.

2. A device as defined in claim 1, wherein said support members comprise a plurality of spaced, parallel rods opposite ends of which extend into registering pluralities of openings formed in said frame and said housing, respectively, said rods are slidable in said openings in said frame, and are fixed in said openings in said housing, and said resilient means comprises a plurality of compression springs each of which surrounds one of said rods between said housing and said frame resiliently to urge said housing toward said first limit position.

3. A device as defined in claim 1, wherein said work gripping mechanism comprises a pair of jaws mounted on said frame for adjustment toward and away from each other, and a rotatable knob connected to said jaws and operatively supported on said frame for rotation manually and selectively in opposite directions thereby to shift said jaws selectively toward and away from each other.

4. A device as defined in claim 1, wherein said means on said housing for securing said hand tool thereto comprises, a pair of spaced, flexible clamping elements formed on the end of said housing remote from said frame, and with opposite ends of said elements disposed in spaced, confronting relation to each other, said elements having formed thereon intermediate their ends, and coaxially of said opening in the housing, confronting, arcuate surfaces disposed to surround and grip a registering portion of said hand tool when the tool is secured to said housing, and means connecting together said spaced, confronting ends of said elements and operable selectively to draw said confronting ends together releasably to secure said registering portion of said hand tool to said housing.

5. A device as defined in claim 1, including a pair of shields each secured at one end to said housing outwardly of said opening therein, and projecting in spaced, parallel relation to each other toward said frame, said shields being movable by said housing into operative positions in which the opposite ends thereof are disposed in spaced, surrounding relation to the end of the stock that is to be machined, when said housing is moved toward said frame.

6. A hand-held tool for machining an end of a piece of bar stock, comprising a tool housing having therethrough a central opening, means on said housing releasably securing thereto a power operated hand tool with a rotatable tool bearing end thereof extending into said opening in said housing, a frame having a pair of jaws mounted for adjustment toward and away from each other selectively to clamp a piece of bar stock therebetween, a handle connected to said jaws and rotatable manually on said frame to effect movement of said jaws selectively toward and away from each other, and means connecting said housing to said frame for limited movement of said housing and hand tool in unison toward and away from said frame, and with the opening in said housing and a tool carried by said tool bearing end of the hand tool registering with the end of the stock to be machined, when said frame is secured to the stock, said connecting means including resilient means normally urging said housing away from said frame and resiliently into a first limit position, and said housing being movable by and with said hand tool against the resistance of said resilient means and toward said frame from a retracted to an advanced position with respect thereto, and thereby to engage the tool carried by said rotatable tool bearing end of the hand tool with the end of the stock that is to be machined, when said frame is secured to said stock.

7. A hand-held tool as defined in claim 6, wherein said tool is suppported by said tool bearing end of said hand tool for rotation between said frame and said housing and coaxially of said bar stock, when said frame is secured to said stock.

8. A hand-held tool as defined in claim 7, wherein two shields are secured to said housing adjacent diametrally opposite sides of said central opening, and project in spaced relation to each other toward said frame, and said tool is positioned between said shields, and said shields substantially surround diametrally opposite sides of the end of the stock that is to be machined, when said housing is moved to its advanced position with respect to said frame.

9. A hand-held tool as defined in claim 6, wherein said connecting means further includes a plurality of spaced, parallel rods secured to one end of said housing and projecting slidably intermediate their ends through registering openings in said frame, and said resilient means comprises a compression spring surrounding each of said rods between said housing and said frame resiliently to urge said housing toward said first limit position.

10. A hand-held tool as defined in claim 6, wherein the tool carried by said tool bearing end of the hand tool comprises, a tool holding member secured at one end thereof to said tool bearing end for rotation thereby upon operation of the associated hand tool, and having in the opposite end thereof a conical recess the larger end of which faces in the direction of said frame to register with the end of the stock to be machined, and a plurality of tool bits removably secured in said conical recess in said member with portions thereof projecting beyond said opposite end of said member.

11. A hand-held tool as defined in claim 6, wherein the tool carried by said tool bearing end of the hand tool comprises, a tool holding member secured at one end thereof to said tool bearing end of the hand tool coaxially thereof, and having integral with the opposite end thereof a coaxially disposed, truncated conical sleeve the larger end of which faces said frame to register with the end of the stock to be machined, a tool supporting member surrounding said tool holding member, and having in one end thereof a conical surface similar to and confronting upon the outer conical surface of said sleeve, means for selectively allowing rotation of said tool supporting member relative to said tool holding member, said sleeve having therethrough a plurality of longitudinally extending slots angularly spaced around the axis of said sleeve, a plurality of tool bits, and means mounting one of said tool bits in each of said slots for adjustment selectively into one of several different positions longtitudinaly of the associated slot.

12. A hand-held tool as defined in claim 11, wherein said tool bit mounting means comprises a bit supporting element mounted in each of said slots, each of said elements having a first section thereof extending between the outer conical surface of said sleeve and the confronting conical surface on said tool supporting member, and a second section thereof extending radially inwardly toward the center of said sleeve and having a tool bit secured thereto, and the confronting surfaces of, respectively, said first section of said element and said tool supporting element having thereon threaded sections drivingly connected to each other, whereby upon rotation of said tool supporting member relative to said tool holding member said bit supporting elements are adjusted longitudinally in said slots.

13. A tool, comprising a first member having on one end thereof a cylindrical shank for securing said member in a tool chuck, and having on the opposite end thereof a truncated conical sleeve integral adjacent the smaller end thereof with said cylindrical shank coaxially thereof, a second, axially bored member surrounding said first member coaxially thereof, and having in one end thereof a conical counterbore similar in configuration to and confronting coaxially upon the conical outer surface of said sleeve, said sleeve having therethrough a plurality of longitudinally extending slots angularly spaced around the axis of said sleeve, and means mounting one of a plurality of tool bits in each of said slots for adjustment selectively in any one of a plurality of different operating positions longitudinally of the associated slot.

* * * * *